(12) United States Patent
De Wergifosse et al.

(10) Patent No.: US 12,519,410 B2
(45) Date of Patent: Jan. 6, 2026

(54) PUMP ACTUATING DEVICE, AND ASSOCIATED PUMPING SYSTEM, AIRCRAFT AND FUEL SUPPLY METHOD

(71) Applicant: SAFRAN AIRCRAFT ENGINES, Paris (FR)

(72) Inventors: Huguette De Wergifosse, Moissy-Cramayel (FR); Nicolas Bertrand Georges De Blois, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 278 days.

(21) Appl. No.: 18/254,560

(22) PCT Filed: Nov. 24, 2021

(86) PCT No.: PCT/FR2021/052081
§ 371 (c)(1),
(2) Date: May 25, 2023

(87) PCT Pub. No.: WO2022/112713
PCT Pub. Date: Jun. 2, 2022

(65) Prior Publication Data
US 2024/0396484 A1    Nov. 28, 2024

(30) Foreign Application Priority Data

Nov. 25, 2020  (FR) ...................................... 20 12099

(51) Int. Cl.
*H02P 1/00* (2006.01)
*B64D 37/00* (2006.01)
(Continued)

(52) U.S. Cl.
CPC .......... *H02P 25/188* (2013.01); *B64D 37/005* (2013.01); *F04D 13/06* (2013.01); *H02P 2207/01* (2013.01)

(58) Field of Classification Search
CPC ...... H02P 27/188; H02P 25/18; H02P 25/188; H02P 25/184; H02P 2207/01; H02P 2205/07
See application file for complete search history.

(56) References Cited

U.S. PATENT DOCUMENTS

2015/0315980 A1    11/2015   Edwards et al.

FOREIGN PATENT DOCUMENTS

EP    1 031 716 A2    8/2000
EP    2 940 272 A1    11/2015
(Continued)

OTHER PUBLICATIONS

International Search Report & Written Opinion Issued Mar. 11, 2022, in PCT/FR2021/052081, filed on Nov. 24, 2021, 15 pages.

*Primary Examiner* — Karen Masih
(74) *Attorney, Agent, or Firm* — Oblon, McClelland, Maier & Neustadt, L.L.P.

(57) ABSTRACT

An actuating device of a fuel pump for an aircraft engine includes: a motor, a generator and an electrical connection member, the motor being an asynchronous machine with Dahlander coupling including a first rotor coupled to the pump for actuation thereof, and a first stator including at least one input phase, each input phase comprising two windings, the generator including a second rotor mechanically coupled to a shaft of the engine, and a second stator including at least one output phase, the electrical connection member being configured so as to connect each output phase (Continued)

to an input phase, and to connect the windings of each input phase in series or in parallel according to a speed of the engine.

7 Claims, 2 Drawing Sheets

(51) Int. Cl.
*F04D 13/06* (2006.01)
*H02P 25/18* (2006.01)

(56) References Cited

FOREIGN PATENT DOCUMENTS

EP         3001548 A1 *  3/2016  ............. B64D 41/00
WO    WO 2019/008066 A1    1/2019

\* cited by examiner

PUMP ACTUATING DEVICE, AND ASSOCIATED PUMPING SYSTEM, AIRCRAFT AND FUEL SUPPLY METHOD

TECHNICAL FIELD

The present invention relates to an actuating device intended to drive at least one fuel pump of a fuel pumping system for an aircraft engine.

The invention also relates to a fuel pumping system, an aircraft embedding such a pumping system, and a method for supplying fuel to an engine of such an aircraft.

The invention applies to the field of aeronautics, in particular to the fuel supply of an aircraft engine.

PRIOR ART

It is known to use, on board an aircraft, at least one pump to convey fuel from a fuel tank of the aircraft to a fuel injection device of an engine of the aircraft. Such a pump, generally a volumetric pump, is conventionally actuated by means of a hydraulic circuit of the aircraft.

In the context of the electrification of some aircraft actuators, including the fuel delivery lines, it has been proposed to drive the previously-described pump by means of a rotating electric machine. More specifically, it has been proposed to provide a first rotating electric machine, called "generator", and a second rotating electric machine, called "motor", electrically connected to each other. In this case, the output shaft of the motor is coupled to the pump for driving thereof, and the shaft of the generator is coupled to a shaft of the engine of the aircraft. The generator and the motor typically consist of three-phase machines. In this manner, during the operation of the engine of the aircraft, the generator delivers currents whose frequency is proportional to the rotational speed of the engine of the aircraft (also called "speed"). It follows that the rotational speed at the output of the motor is proportional to the speed of the engine, so that the pump is driven to deliver fuel with a flow rate proportional to the speed of the engine.

Nonetheless, such an actuating device is not fully satisfactory.

Indeed, for the engine to be properly supplied with fuel regardless of its speed, the pump driven by such an actuating device is dimensioned so that, for any given speed, the flow rate supplied by the pump is at least equal to the flow rate required by the engine for said speed. In general, such sizing consists in selecting a pump with an appropriate displacement.

Yet, as illustrated by FIG. 1, the curve 2 of evolution of the fuel flow rate required by the engine as a function of its speed is generally a concave increasing curve. In this case, the displacement is imposed by the operating point that has the highest ratio between the required fuel flow rate and the speed of the engine, amongst the lowest speed operating point (corresponding to an autorotation phase of a fan of the engine, or "windmilling"), illustrated by point 4, and the highest speed operating point (corresponding to a take-off phase, or "take-off"), illustrated by the point 6.

In the case where the displacement is imposed by the lowest speed operating point 4, the fuel flow rate supplied by the pump, symbolized by the line 8 which passes through said lowest speed operating point 4, is always higher than the fuel flow rate required by the engine. For example, at the highest speed operating point 6, the excess fuel flow rate is symbolized by the arrow 10. In this case, the installation of a fuel recirculation device is necessary.

During its operation, such a recirculation device, generally connected at the output of a gearbox of the engine, draws mechanical power at the output of said gearbox, and dissipates a portion of the drawn mechanical power in the form of heat. Yet, such heat dissipation is detrimental because the fuel circuit (which comprises the injection device) is used as a cold source for the oil circuit. Any additional heat dissipation has a negative impact on the size of the exchangers.

Hence, the invention is intended to provide a pump actuating device which, for any given operating point of the engine, results in a smaller discrepancy between the fuel flow rate required for said operating point and the fuel flow rate supplied by the pump, i.e. which reduces the need for fuel recirculation.

DISCLOSURE OF THE INVENTION

To this end, an object of the invention is an actuating device of the aforementioned type, including a motor rotating electric machine, a generator rotating electric machine and an electrical connection member,

- the motor rotating electric machine being an asynchronous machine with Dahlander coupling comprising a first rotor, intended to be mechanically coupled to each pump for actuation thereof, and a first stator comprising at least one input phase, each input phase comprising two windings,
- the generator rotating electric machine comprising a second rotor, intended to be mechanically coupled to a shaft of the engine forming a drive shaft, and a second stator comprising at least one output phase,
- the electrical connection member being configured to electrically connect each output phase to an input phase,
- the electrical connection member being further configured so to connect, for each input phase, the corresponding windings in series or in parallel according to a speed of the engine.

Indeed, such an actuating device allows selecting the highest speed operating point for sizing of the pump (in particular for the selection of its displacement), even when the highest ratio of the required fuel flow rate to the speed of the engine corresponds to the lowest speed operating point (i.e. the auto-rotation phase of the fan). In this case, by its action, the electrical connection device enables two distinct operating modes:

- for a speed higher than a so-called "switching" speed, the windings of the motor are connected according to a first configuration, the motor then being driven, by its power supply by the generator, at a rotational speed proportional to the speed of the engine, with a first proportionality ratio; and
- below the switching speed, the windings of the motor are connected according to a second configuration, the motor then being driven, by its power supply by the generator, at a rotational speed proportional to the speed of the motor, with a second proportionality ratio higher than the first proportionality ratio.

In particular, the switching speed corresponds to the speed for which the fuel flow rate supplied in the first configuration and the fuel flow rate required by the engine are equal.

It arises from the foregoing that, thanks to the actuating device according to the invention, the discrepancy between the fuel flow rate required for any given operating point of the engine of the aircraft and the fuel flow rate supplied by the pump is less significant than that obtained by means of known actuating devices. Hence, the fuel recirculation need is significantly reduced.

According to other advantageous aspects of the invention, the actuating device includes one or more of the following features, considered separately or in any technically-possible combination:

the electrical connection member is configured so as to connect, for each input phase of the motor rotating electric machine, the corresponding windings in parallel if the speed of the engine is lower than or equal to a predetermined switching speed, and in series otherwise;

the motor rotating electric machine comprises three input phases connected together according to a delta connection, the two windings of each input phase being electrically connected together by their ends at a midpoint, each winding of a given input phase being connected to a corresponding winding of another respective input phase at its end opposite to the corresponding midpoint to form a vertex, the electrical connection member including a control stage, a first stage of switches, a second stage of switches and a third stage of switches, each input of the first stage of switches being electrically connected to a respective output phase of the generator rotating electric machine, each output of the first stage of switches being connected to the midpoint of a respective input phase, each input of the second stage of switches being electrically connected to a respective output phase of the generator rotating electric machine, each output of the second stage of switches being connected to a respective vertex of the first stator, the inputs of the third stage of switches being electrically connected together, each output of the third stage of switches being connected to the midpoint of a respective input phase, the control stage being configured so as to control, when the speed of the engine is higher than a predetermined switching speed, the first stage of switches to be in an on state, and each one amongst the second stage of switches and the third stage of switches to be in an off state, the control stage being also configured so as to control, when the engine speed is lower than or equal to the predetermined switching speed, the first stage of switches to be in an off state, and each one amongst the second stage of switches and the third stage of switches to be in an on state.

Furthermore, an object of the invention is a fuel pumping system for an aircraft engine, the pumping system comprising at least one fuel pump and an actuating device as defined hereinabove, the first rotor of the motor rotating electric machine being mechanically coupled to each pump for actuation thereof.

Furthermore, an object of the invention is an aircraft embedding a pumping system as defined hereinabove, each pump being inserted between a fuel tank of the aircraft and a fuel injection device of an engine of the aircraft, the second rotor of the generator rotating electric machine being mechanically coupled to a shaft of the engine.

Another object of the invention is a method for supplying fuel to an engine of an aircraft as defined hereinabove, comprising connecting each output phase of the generator rotating electric machine to an input phase of the motor rotating electric machine, the supply method also including, for each input phase, connecting the corresponding windings in series or in parallel according to a speed of the engine.

According to an advantageous aspect, the supply method includes, for each input phase, connecting the corresponding windings in parallel if the speed of the engine is lower than or equal to a predetermined switching speed, and in series otherwise.

BRIEF DESCRIPTION OF THE DRAWINGS

The invention will be better understood from the following description, given only as a non-limiting example and made with reference to the appended drawings wherein.

DETAILED DISCLOSURE OF PARTICULAR EMBODIMENTS

Figure 2:
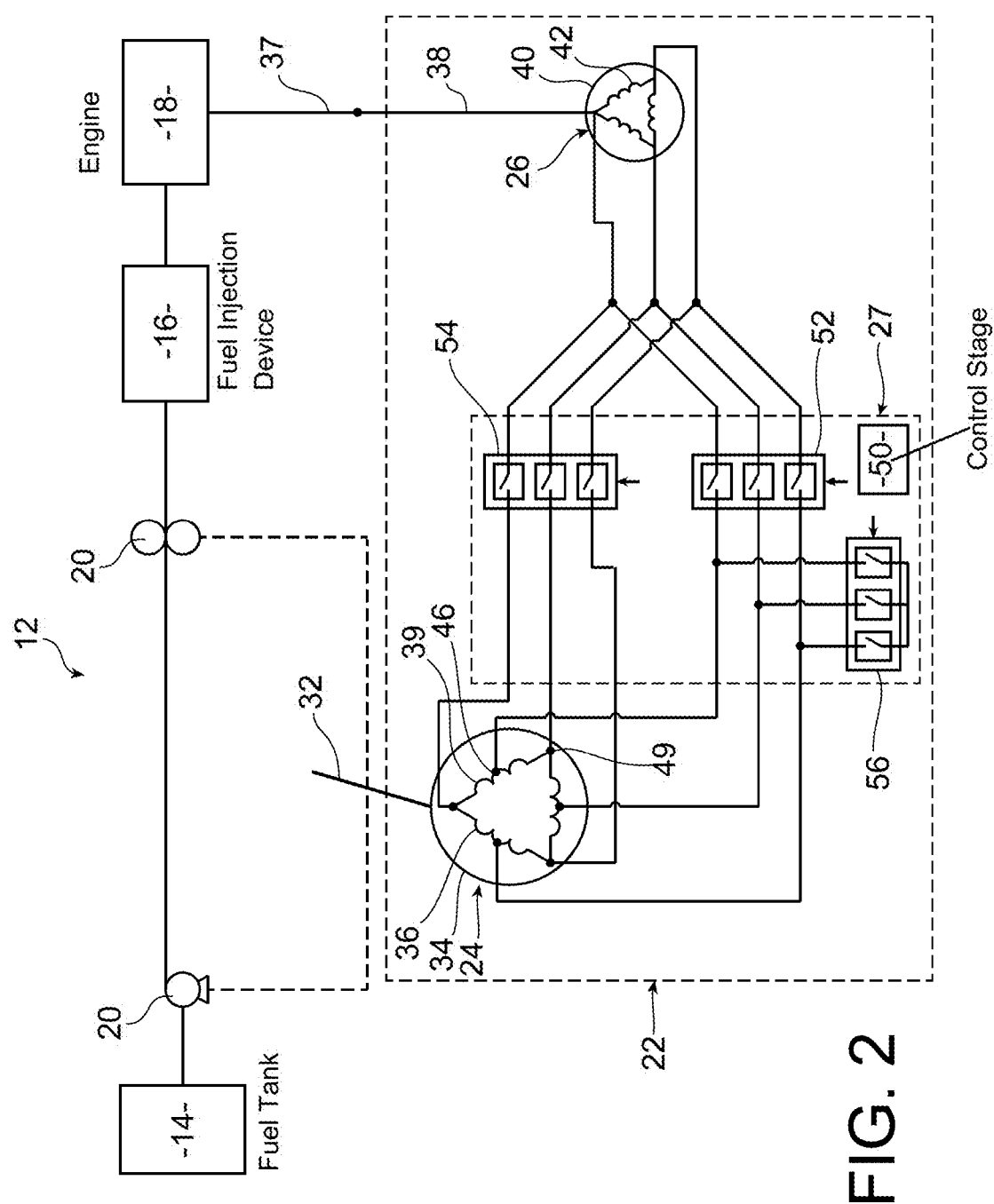
FIG. 2 is a schematic representation of a pumping system according to the invention.

A fuel pumping system 12 according to the invention, in particular for an aircraft engine, is illustrated by FIG. 2.

The pumping system 12 is intended to convey fuel from a fuel tank 14 of an aircraft (not represented) towards a fuel injection device 16 of an engine 18 of the aircraft.

More specifically, the pumping system 12 includes at least one rotary pump 20, intended to be arranged between the fuel tank 14 and the injection device 16, and an actuating device 22 to drive the or each pump 20.

Each pump 20 is a volumetric pump, or a centrifugal pump.

The actuating device 22 includes a motor rotating electric machine 24 (called "motor"), a generator rotating electric machine 26 (called "generator") and an electrical connection member 27.

The motor 24 is configured to receive electrical energy from the generator 26, and to convert the received electrical energy into mechanical energy intended to actuate the or each pump 20.

The motor 24 is an asynchronous machine with Dahlander coupling. The motor 24 comprises a rotor 32 (called "first rotor") and a stator 34 (called "first stator").

The first rotor 32 is mechanically coupled to at least one pump 20 to cause actuation thereof.

The first stator 34 includes at least one phase 36, called "input phase", in particular three input phases 36.

Each input phase 36 of the motor 24 is connected to a corresponding output phase 42 of the generator 26, via electrical connection member 27, as will be described later on.

Each input phase 36 includes two windings 39, each comprising two ends. For each input phase 36, the two corresponding windings 39 are electrically connected together, by one of their ends, at a midpoint 46. Furthermore, for each winding 39, the end opposite to the midpoint 46, associated with the reference numeral 48, is connected to the electrical connection member 27.

As shown in FIG. 2, the end 48 of each input phase 36 is connected to an end 48 of another respective input phase 36 at a vertex 49, so that the input phases 36 are connected together according to a delta connection. Nevertheless, a star coupling of the input phases 36 may also be considered.

Advantageously, and in particular in order to facilitate the start-up of the motor 24, the actuating device 22 also comprises a coupling member (not represented) configured to make the input phases switch between a delta coupling and a star coupling.

The generator 26 is configured to draw mechanical energy from a shaft 37 of the engine 18 (so-called "drive shaft"), and to convert the drawn mechanical energy into electrical energy. For example, the drive shaft 37 is the low-pressure shaft of the engine 18.

The generator 26 comprises a rotor 38 (called "second rotor") and a stator 40 (called "second stator").

The second rotor 38 is mechanically coupled to the drive shaft 37 of the engine by means of any suitable mechanical transmission member such as a reduction gear.

The second stator 40 includes at least one phase 42, called "output phase". More specifically, the number of output phases 42 of the second stator is equal to the number of input phases 36 of the first stator 34, in particular three output phases 42. Each output phase 42 is electrically connected to the electrical connection member 27 for connection thereof to a corresponding input phase 36.

Preferably, the generator 26 is a permanent magnet synchronous machine or an asynchronous machine.

The electrical connection member 27 is configured to electrically connect each output phase 42 to an input phase 36. Furthermore, the electrical connection member 27 is configured so as to connect, for each input phase 36 of the motor 24, the corresponding windings 39 in series or in parallel, according to the current speed of the engine 18.

The electrical connection member 27 comprises a control stage 50, a first stage of switches 52, a second stage of switches 54 and a third stage of switches 56.

The control stage 50 is configured to control the on or off state of each stage of switches 52, 54, 56 (i.e. each of their respective switches).

Each stage of switches 52, 54, 56 comprises as many switches 58 as input phases 36. In particular, each stage of switches comprises three switches.

Advantageously, each switch 58 is a relay, a contactor or an electronic switch, in order to limit the risks of deterioration thereof over time.

Each input of the first stage of switches 52 (i.e. the input of each of its switches) is electrically connected to a respective output phase 42 of the generator 26. Furthermore, each output of the first stage of switches 52 (i.e. the output of each of its switches) is connected to the midpoint 46 of a respective input phase 36.

Each input of the second stage of switches 54 is electrically connected to a respective output phase 42 of the generator 26. Furthermore, each output of the second stage of switches 54 is connected to a respective vertex 49 of the first stator 34.

Finally, the inputs of the third stage of switches 56 are electrically connected together. Furthermore, each output of the third stage of switches 56 is connected to the midpoint 46 of a respective input phase 36.

The control stage 50 of the electrical connection member 27 is adapted to control the state of each of the first, second and third stages of switches according to a speed of the engine 18.

For example, such a speed of the engine is deduced from the rotational speed of a shaft of the engine 18, in particular the drive shaft 37, or from information representative of a flight phase of the aircraft, or from aircraft piloting instructions.

Still more specifically, when the speed of the engine 18 is higher than a predetermined switching speed, the control stage 50 is configured so as to control:
the first stage of switches 52 to be in an on state (i.e. so that each of its switches is in an on state); and
each of the second stage of switches 54 and the third stage of switches 56 to be in an off state (i.e. so that each of their respective switches is in an off state).

In this way, for each input phase 36, the corresponding windings 39 are connected in series. Furthermore, each input phase 36 is connected to a corresponding output phase 42. It follows that, in operation, the motor 24 is driven, by its power supply by the generator 26, at a rotational speed proportional to the speed of the engine, with a first proportionality ratio $k_1$. The fuel flow rate delivered by the pumping system 12, in this configuration, is illustrated, in FIG. 3, by the segment of the line 70 comprised between the points 72 and 66, which will be described later on.

Furthermore, when the speed of the engine 18 is lower than or equal to the predetermined switching speed, the control stage 50 is configured so as to control:
the first stage of switches 52 to be in an off state; and
each of the second stage of switches 54 and the third stage of switches 56 to be in an on state.

In this way, for each input phase 36, the corresponding windings 39 are connected in parallel. Furthermore, each input phase 36 is connected to a corresponding output phase 42. It follows that, in operation, the motor 24 is driven, by its power supply by the generator 26, at a rotational speed proportional to the speed of the engine, with a second proportionality ratio $k_2$ equal to twice the first proportionality ratio $k_1$. The fuel flow rate delivered by the pumping system 12, in this configuration, is illustrated, in FIG. 3, by the segment of the line 68 comprised between the origin and the point 72.

Figure 1:
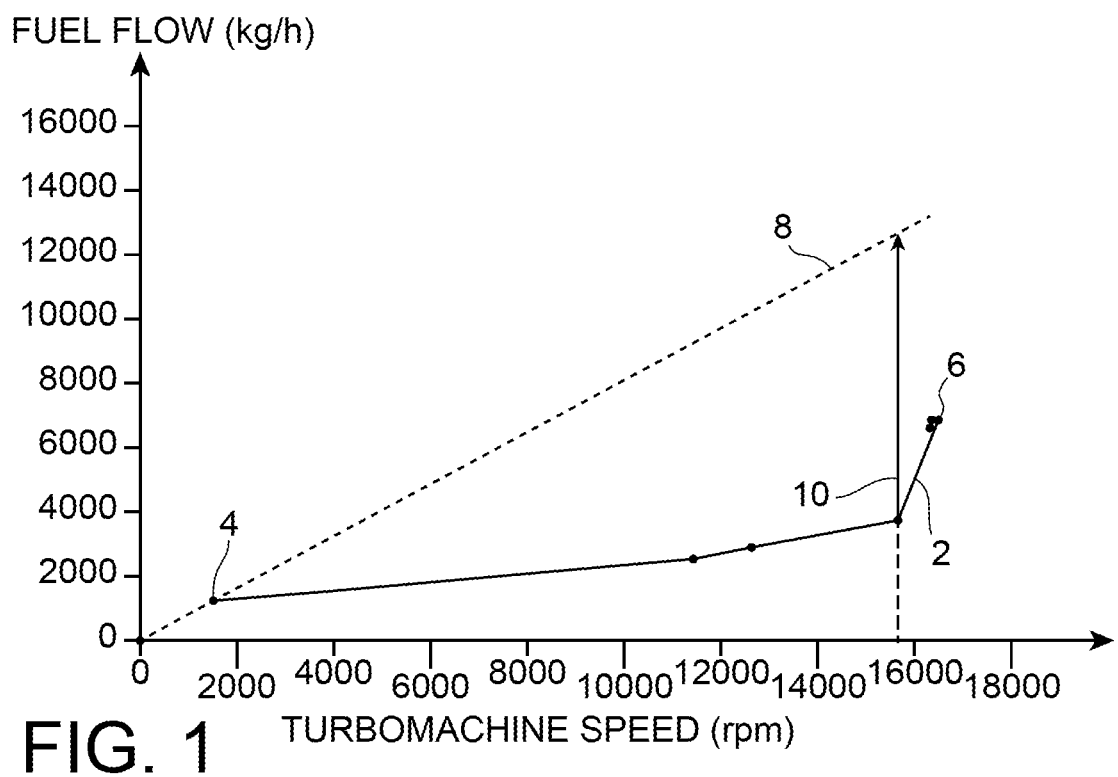
FIG. 1 is a graph representing the fuel need of an engine as a function of a rotational speed of its high-pressure shaft.
Figure 3:
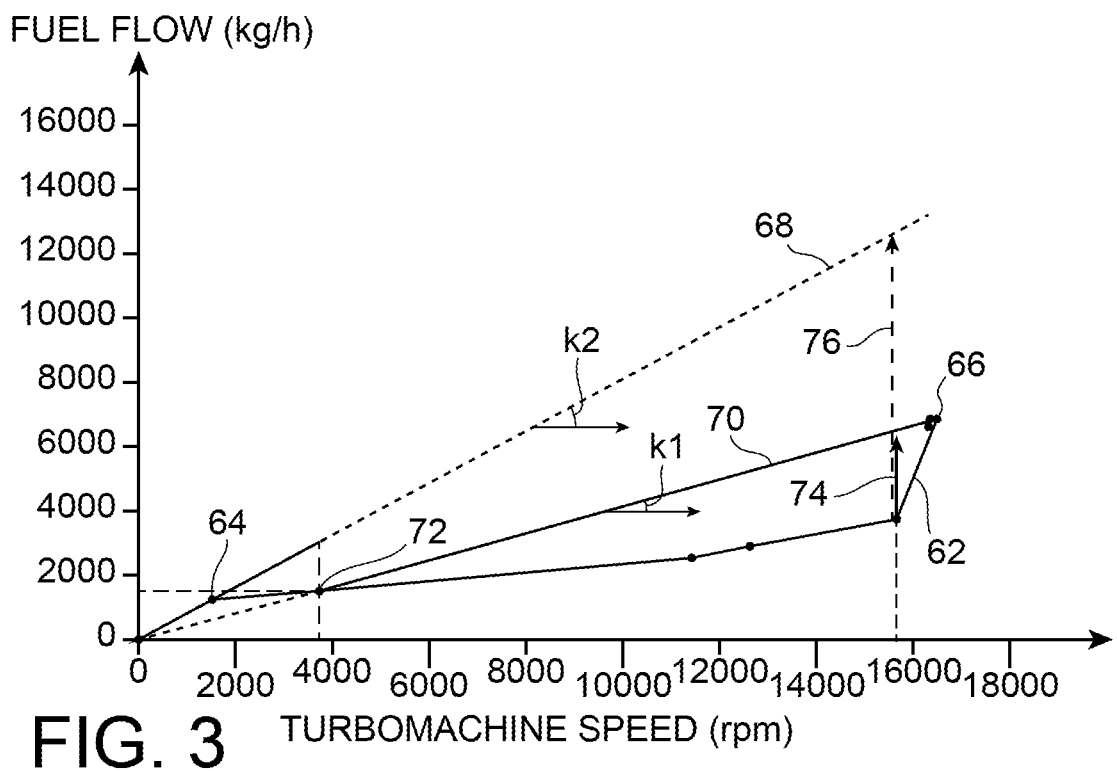
FIG. 3 is similar to FIG. 1, the evolution of the fuel flow rate supplied by the pumping system of FIG. 2 being also represented.

The switching speed will now be defined, with reference to FIG. 3.

In this figure, the curve 62 represents the evolution of the fuel flow rate required by the engine 18 as a function of its speed. The curve 62 extends from the point 64, which is the lowest speed operating point of the engine 18, to the point 66, which is the highest speed operating point.

The point 64 is associated to an operating point for which the ratio of the required fuel flow rate to the speed of the engine 18 is higher than the ratio of the required fuel flow rate to the speed of the engine associated to the point 66.

As indicated before, such a curve 62 generally increases with the speed and is substantially concave.

The line 68, which passes through the lowest speed operating point 64, represents the fuel flow rate supplied by the pumping system 12 when, for each input phase 36 of the motor 24, the corresponding windings 39 are connected in parallel.

The displacement of the pump 20 is selected so that, at the point 64, the fuel flow rate supplied by the pumping system 12 is at least equal to the fuel flow rate required by the motor, the windings 39 of each input phase 36 being connected in parallel.

Furthermore, the line 70 represents the fuel flow rate supplied by the pumping system 12 when the windings 39 of each input phase 36 of the motor 24 are connected in series.

As shown in this FIG. 3, for any speed higher than the speed associated with the intersection point 72 of the straight line 70 with the curve 62, the pumping system 12, in which the windings 39 of each input phase 36 of the motor 24 are connected in series, is able to supply fuel to the engine 18 with a flow rate higher than or equal to the flow rate required by the engine. Said intersection point forms the switching point, the associated speed being called "switching speed".

It appears in this figure that, beyond the switching speed, the need for fuel recirculation when the pump 20 is driven to supply fuel to the injection device 16 with a flow rate that follows the line 70 (arrow 74) is significantly reduced compared to the need for fuel recirculation in the situation where the pump 20 is driven to supply fuel to the injection device 16 with a flow rate which follows the line 68 (arrow 76).

Alternatively, the switching speed is a predetermined speed distinct from the speed corresponding to the previously-described operating point 72.

The operation of the pumping system 12 will now be described.

During the operation of the engine 18, the electrical connection member 27 controls the configuration of the windings 39 of the input phases 36 according to the speed of the engine 18.

As long as the speed of the engine 18 is lower than or equal to the predetermined switching speed, then the control stage 50 controls each stage of switches 52, 54, 56 so that the windings 39 of each input phase 36 of the motor 24 are connected in parallel, and each input phase 36 is connected to a corresponding output phase 42 of the generator 26.

In this case, the motor 24 drives the pump 20 at its maximum speed with regards to the currents derived from the generator 26. In this way, by its sizing, the pump 20 delivers fuel to the engine 18 at a flow rate at least equal to the fuel flow rate required by said engine 18.

If the speed of the engine 18 exceeds the predetermined switching speed, then the control stage 50 controls each stage of switches 52, 54, 56 so that the windings 39 of each input phase 36 of the motor 24 are connected in series, and each input phase 36 is connected to a corresponding output phase 42 of the generator 26.

In this case, the pump 20 remains driven at a speed proportional to that of the engine, but delivers fuel to the engine 18 according to a flow rate half as low as compared to the fuel flow rate that would have been obtained if the windings 39 of each input phase 36 had been connected in parallel. Nevertheless, the supplied fuel flow rate is at least equal to the fuel flow rate required by the engine, and the fuel recirculation needs are reduced.

The invention claimed is:

1. An actuating device intended to drive at least one fuel pump of a fuel pumping system for an aircraft engine, the actuating device comprising:
    a motor rotating electric machine,
    a generator rotating electric machine, and
    an electrical connection member,
    the motor rotating electric machine being an asynchronous machine with Dahlander coupling comprising a first rotor, intended to be mechanically coupled to each pump for actuation thereof, and a first stator comprising at least one input phase, each input phase comprising two windings,
    the generator rotating electric machine comprising a second rotor, intended to be mechanically coupled to a shaft of the engine forming a drive shaft, and a second stator comprising at least one output phase,
    the electrical connection member being configured to electrically connect each output phase to an input phase,
    the electrical connection member being further configured so to connect, for each input phase, the corresponding windings in series or in parallel according to a speed of the engine.

2. The actuating device according to claim 1, wherein the electrical connection member is configured so as to connect, for each input phase of the motor rotating electric machine, the corresponding windings in parallel if the speed of the engine is lower than or equal to a predetermined switching speed, and in series otherwise.

3. The actuating device according to claim 1, wherein the motor rotating electric machine comprises three input phases connected together according to a delta connection,
    the two windings of each input phase being electrically connected together by ends thereof at a midpoint, each winding of a given input phase being connected to a corresponding winding of another respective input phase at an end thereof opposite to the corresponding midpoint to form a vertex,
    the electrical connection member including a control stage, a first stage of switches, a second stage of switches and a third stage of switches,
    each input of the first stage of switches being electrically connected to a respective output phase of the generator rotating electric machine, each output of the first stage of switches being connected to the midpoint of a respective input phase,
    each input of the second stage of switches being electrically connected to a respective output phase of the generator rotating electric machine, each output of the second stage of switches being connected to a respective vertex of the first stator,
    the inputs of the third stage of switches being electrically connected together, each output of the third stage of switches being connected to the midpoint of a respective input phase,
    the control stage being configured so as to control, when the speed of the engine is higher than a predetermined switching speed, the first stage of switches to be in an on state, and each one amongst the second stage of switches and the third stage of switches to be in an off state,
    the control stage being also configured so as to control, when the speed of the engine is lower than or equal to the predetermined switching speed, the first stage of switches to be in an off state, and each one amongst the second stage of switches and the third stage of switches to be in an on state.

4. A fuel pumping system for an aircraft engine, the pumping system comprising:
    at least one fuel pump, and
    an actuating device according to claim 1, the first rotor of the motor rotating electric machine being mechanically coupled to each pump for actuation thereof.

5. An aircraft embedding a pumping system according to claim 4, each pump being inserted between a fuel tank of the aircraft and a fuel injection device of an engine of the aircraft, the second rotor of the generator rotating electric machine being mechanically coupled to a shaft of the engine.

6. A method for supplying fuel to an engine of an aircraft according to claim 5, comprising:
    connecting each output phase of the generator rotating electric machine to an input phase of the motor rotating electric machine, and for each input phase, connecting the corresponding windings in series or in parallel according to a speed of the engine.

7. The method for supplying fuel to an engine according to claim 6, including, for each input phase, connecting the corresponding windings in parallel if the speed of the engine is lower than or equal to a predetermined switching speed, and in series otherwise.

\* \* \* \* \*